United States Patent
Maughan et al.

[11] Patent Number: 5,885,022
[45] Date of Patent: Mar. 23, 1999

[54] BALL JOINT WITH POLYMER HOUSING

[75] Inventors: Garth B. Maughan, Delta; Gregory R. Atkins, Toledo, both of Ohio

[73] Assignee: Dana Corporation, Toledo, Ohio

[21] Appl. No.: 893,100

[22] Filed: Jul. 15, 1997

[51] Int. Cl.$^6$ .................................................. F16C 11/06
[52] U.S. Cl. ........................ 403/135; 403/137; 403/122
[58] Field of Search ........................... 403/122, 135, 403/132, 76, 77, 130, 140, 137, 133

[56] References Cited

U.S. PATENT DOCUMENTS

| | | | |
|---|---|---|---|
| 2,708,591 | 5/1955 | Schiesel | 403/77 X |
| 2,791,454 | 5/1957 | Saives | 287/85 |
| 2,811,377 | 10/1957 | Latzen | 403/137 |
| 3,113,780 | 12/1963 | Livingstone | 273/186 |
| 3,329,454 | 7/1967 | Melton et al. | 403/77 |
| 3,424,419 | 1/1969 | Siegel | 403/76 X |
| 3,524,664 | 8/1970 | Scheublein, Jr. et al. | 403/140 |
| 3,574,369 | 4/1971 | Andrew | 403/132 |
| 3,833,309 | 9/1974 | Hobbs | 403/122 |
| 3,902,816 | 9/1975 | Moore | 403/137 X |
| 4,435,101 | 3/1984 | Sugiyama et al. | 403/122 |
| 4,478,531 | 10/1984 | Levinson et al. | 403/77 |
| 4,482,266 | 11/1984 | Kaneko | 403/122 X |
| 4,568,216 | 2/1986 | Mizusawa et al. | 403/143 |
| 4,601,603 | 7/1986 | Nakayama | 403/143 |
| 5,267,805 | 12/1993 | Ueno | 403/134 |
| 5,352,059 | 10/1994 | Ueno et al. | 403/132 X |
| 5,615,967 | 4/1997 | Hellon | 403/130 X |

FOREIGN PATENT DOCUMENTS

| | | | |
|---|---|---|---|
| 841298 | 5/1970 | Canada | 403/135 |
| 845561 | 5/1939 | France | 403/130 |
| 364495 | 11/1922 | Germany | 403/143 |

*Primary Examiner*—Harry C. Kim
*Attorney, Agent, or Firm*—Rader, Fishman & Grauer PLLC

[57] ABSTRACT

A ball joint having a polymeric housing with an integral bearing seat for receiving a ball stud. A polymeric cap attaches to the housing and includes a bearing cavity for contacting the ball stud. The housing and bearing cap each have retention features that cooperate to securely assemble the joint. A pattern of reinforcing ribs are optionally provided on the outer surface of the housing to increase strength and dimensional stability.

10 Claims, 3 Drawing Sheets

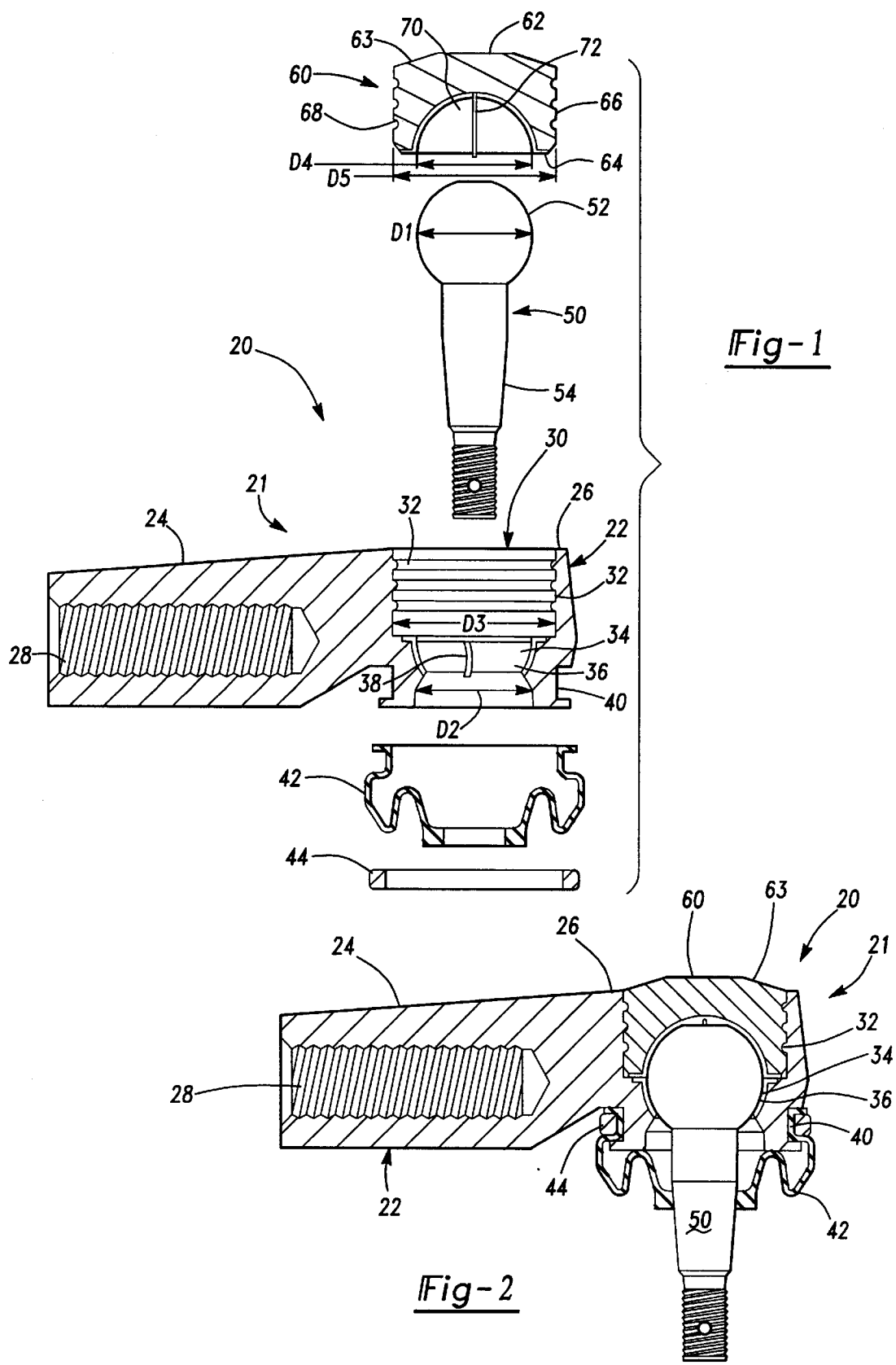

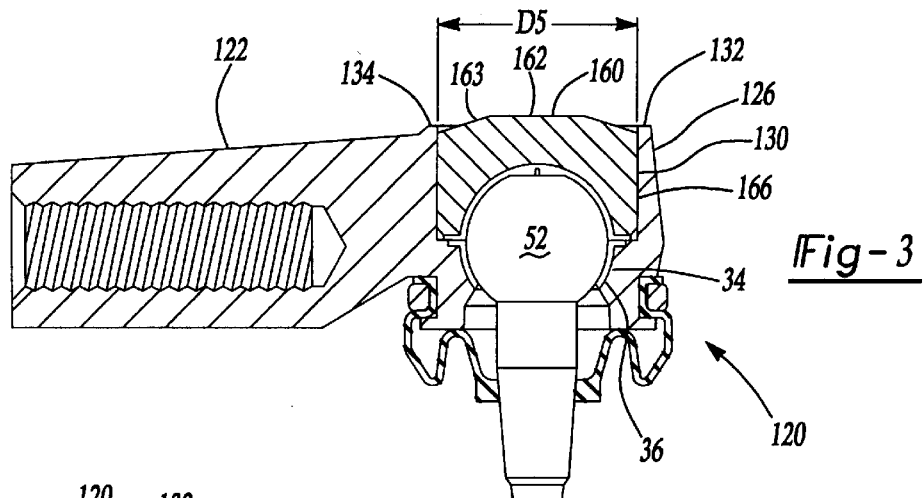
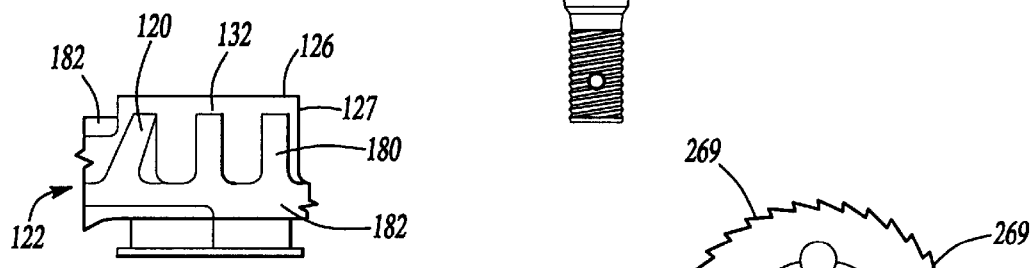
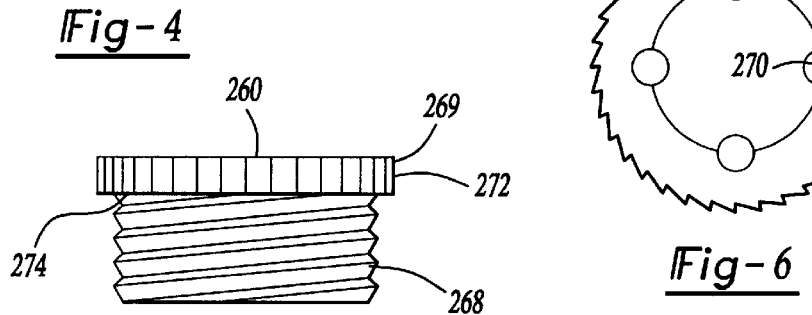
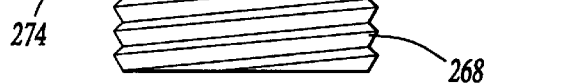
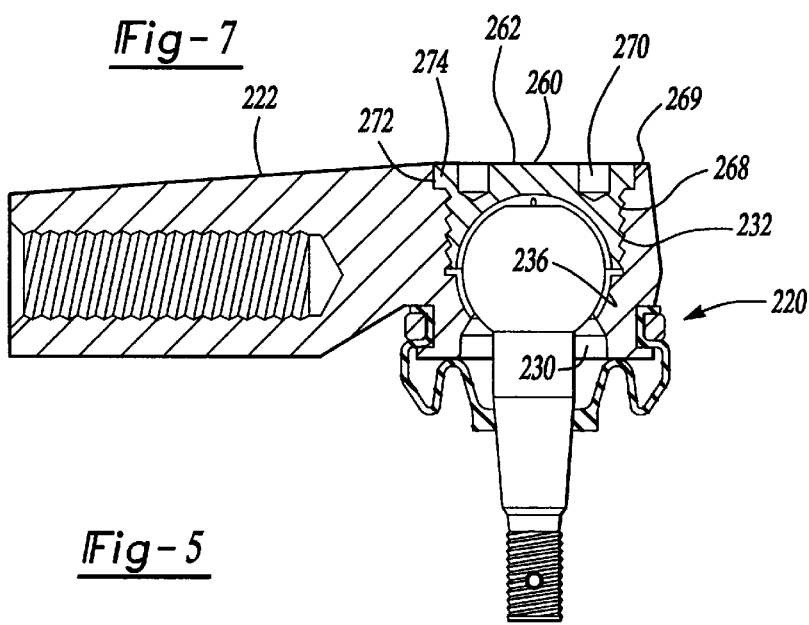

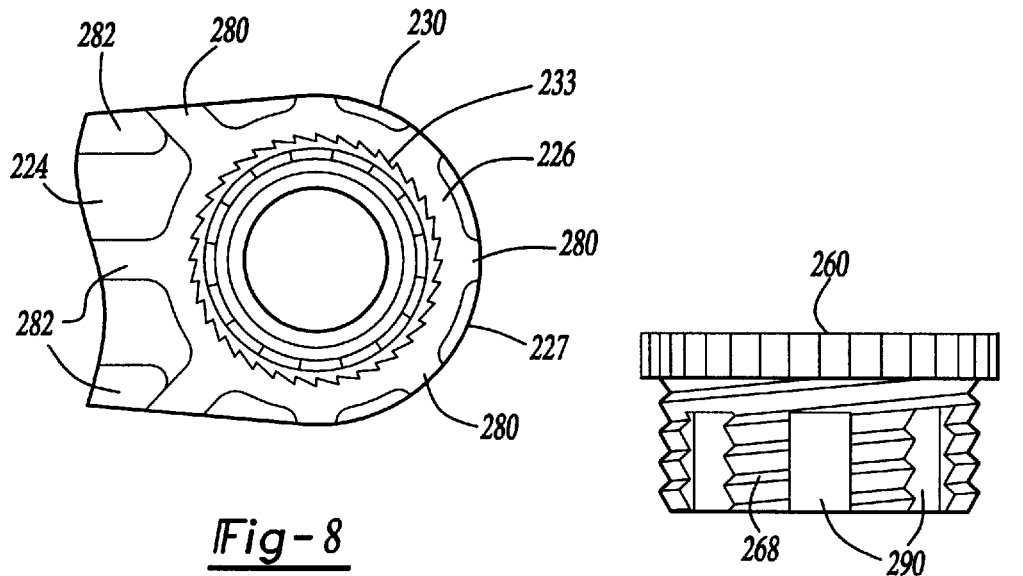
Fig-8
Fig-9
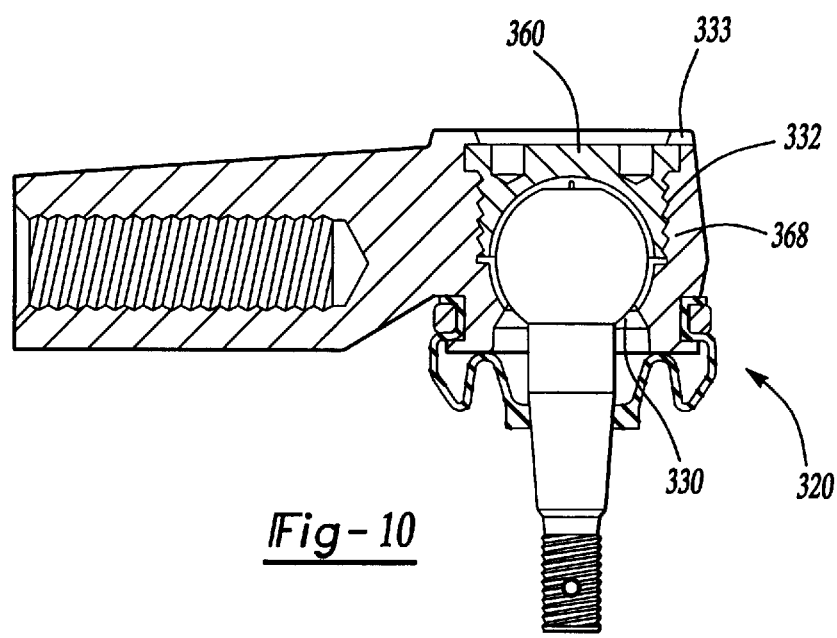
Fig-10

BALL JOINT WITH POLYMER HOUSING

FIELD OF THE INVENTION

The present invention relates to a ball joint for transmitting force through a linkage and, more particularly, to a ball and socket joint for use in motor vehicle applications. The ball joint of the present invention includes a steel ball stud received in a polymeric housing having an integral bearing seat. A polymeric bearing cap is retained in the housing and includes a bearing cavity for contacting the ball stud.

BACKGROUND OF THE INVENTION

Ball joints having molded plastic sockets that receive a metallic ball stud are known. Previous plastic socket designs have inserted additional parts such as a metallic bearing ring for contact against the ball stud to reduce socket wear. However, additional loose parts increase assembly time and concerns about corrosion occurring between the metallic ball stud and the metallic bearing ring.

The construction of known ball joints also includes a plastic cap that is either inserted or screwed into a bore in the socket for contacting the ball stud. However, preventing caps from pushing out of the bores has been a problem. In addition, screwing in a fully threaded cap increases assembly time.

Previous ball joints have not allowed incremental torque adjustments to be made during the service life of the joint to compensate for wear or other changing conditions. Nor have the previous designs provided a pattern of reinforcing ribs to decrease the amount of socket material and increase strength and dimensional stability.

SUMMARY OF THE INVENTION

The present invention is directed to a ball and socket joint for transmitting forces through a linkage. The socket has two pieces including a one-piece polymeric housing and a polymeric bearing cap that inserts into the housing. The housing has an eye connected to a stem. A through bore is provided in the eye and has a plurality of different retaining features that correspond with complementary retaining features on the bearing cap to maintain the cap in the housing. The multiple retaining features help to reduce or eliminate unwanted push out of the bearing cap, thereby improving reliability and providing longer bearing life. Some of the retaining features include: multiple ribs on the cap which press into corresponding grooves in the through bore, localized fusion, interference fits, screw threads, and ratchet teeth.

A ball stud having a generally spherical head connected to a shank is located in the housing through bore. The spherical head engages both the integral bearing surface in the bore and a bearing cavity provided on a bottom surface of the bearing cap. Grease grooves can optionally be provided in either the integral bearing surface or the bearing cavity or both.

In addition, reinforcing ribs are located in a pattern on an exterior surface of the housing, adjacent the eye. Some ribs extend vertically and others extend horizontally. The vertical ribs are circumferentially spaced apart around the eye. The horizontal ribs extend from the eye to the stem and are generally longer than the vertical ribs. Reinforcing ribs increase the stiffness and strength of the housing and allow less material to be used. Proper rib placement can also increase dimensional stability.

One embodiment of the present invention utilizes a combination of screw threads and ratchet teeth to retain the bearing cap in the through bore. The ratchet teeth allow movement only in a tightening direction. Therefore, incremental torque adjustments can be made to the joint by tightening the bearing cap. These incremental torque adjustments are made throughout the service life of the joint to compensate for wear or other changing conditions. Removal or loosing of the bearing cap is prevented by the ratchet teeth.

Another embodiment of the present invention has axial slots in the lead threads of the bearing cap and threads of the through bore to allow faster insertion of the cap thereby reducing assembly costs.

Other embodiments retain the cap using the combination of a press fit or screw threaded cap that is locally fused to a lip on the housing using ultrasonic or vibrational welding. Localized fusion creates a strong, permanent connection to prevent push out of the cap. Also, because the parts are fused together, a seal is formed which prevents corrosive materials from entering the joint.

BRIEF DESCRIPTION OF THE DRAWINGS

The features and inventive aspects of the present invention will become more apparent upon reading the following detailed description, claims, and drawings, of which the following is a brief description:

FIG. 1 is an exploded view of a ball joint according to a first embodiment of the present invention.

FIG. 2 is a side cross-section of an assembled ball joint.

FIG. 3 shows a side cross-section of a second embodiment according to the present invention.

FIG. 4 shows a housing having reinforcing ribs according to the present invention.

FIG. 5 is a side cross-sectional view of a third embodiment of the present invention.

FIG. 6 is a top view of a bearing cap according to the third embodiment.

FIG. 7 is a side view of a bearing cap.

FIG. 8 is top view of a housing according to the third embodiment.

FIG. 9 is a fourth embodiment of a ball joint according to the present invention.

FIG. 10 is a view of the present invention.

DETAILED DESCRIPTION OF PREFERRED EMBODIMENTS

FIG. 1 shows an exploded view of one embodiment of a ball joint 20 according to the present invention. A socket 21 is illustrated having a housing 22 that includes a stem 24 connected to an eye 26. Housing 22 is preferably a one-piece member made from polymeric material to reduce weight and resist corrosion. However, any suitable material may be utilized, including polyacetals and polyamides. Nylon is one material contemplated for the present invention. Stem 24 is shown having a threaded blind bore 28 for attaching housing 22 to a mating component (not shown). Stem 24 projects radially outwardly from eye 26 and is generally perpendicular to a through bore 30.

Eye 26 includes a through bore 30 having a series of retaining projections 32 extending radially inward and an integral bearing seat 34 located below retaining projections 32. Bearing seat 34 has a generally annular shape with a concave inner surface 36 and optional grease grooves 38 to improve joint lubrication. Housing 22 also includes a circumferential groove 40 for attaching a sealing boot 42 using a fastener 44, such as a spring clip.

A steel ball stud 50 is designed to be received in eye 26, in contact with integral bearing seat 34. Ball stud 50 includes a generally spherical head 52 connected to a shank 54. Head 52 has a diameter D1 that is greater than an inner diameter D2 of bearing seat 34 but less than a diameter D3 of through bore 30. Therefore, head 52 can be inserted vertically downward into through bore 30 until seating against bearing seat 34 which prevents further downward travel. Although steel is the preferable material for ball stud 50 due to its high strength and low cost, any suitable material can be used.

A generally cylindrical bearing cap 60, having a top surface 62 connected to a bottom surface 64 by a side surface 66, is provided for insertion into eye 26. There are a plurality of retaining grooves 68 located on side surface 66 that resiliently deform upon insertion to engage retaining projections 32 and maintain cap 60 in eye 26. Providing multiple retaining grooves 68 increases surface area and consequently frictional engagement between cap 60 and eye 26 is increased. Retaining grooves 68 and projections 32 are located at predetermined positions to establish predetermined levels of contact for ball stud head 52 against bearing seat 34 and bearing cavity 70. If needed, a pre-load condition can be achieved by proper positioning of retaining grooves 68 and projections 32. Bottom surface 64 has a generally semi-spherical bearing cavity 70 for mating contact with ball stud head 52.

Bearing cavity 70 has a diameter D4 slightly larger than head diameter D1 and includes optional grease grooves 72 to provide improved bearing life. Cap top surface 62 has chamfered edges 63 to blend with housing 22 after installation, as shown in FIG. 2. To avoid the need for grease grooves 72, bearing seat 34 and bearing cavity 70 can be self lubricating surfaces, depending on housing material, fillers and additives. For example, a lubricating material, such as molybdenum disulfide, can be impregnated into the housing material. To increase strength, reinforcing materials such as glass beads or fibers can be added.

FIG. 3 shows another embodiment of the present invention having a different mechanism for retaining bearing cap 160. Label numbers remain the same for identical features. Housing 122 has an eye 126 having a generally smooth through bore 130. Bearing cap 160 has a generally smooth side surface 166 and a slightly larger diameter D5 than through bore diameter D3 to create a friction fit upon installation. The friction fit is not the only mechanism for retaining bearing cap 160, however. A second retention mechanism includes a lip 132 that protrudes from an uppermost portion 134 of bore 130 and is locally fused to bearing cap 160 using any suitable technique, including vibrational welding or ultrasonic welding. Lip 132 extends vertically upwardly before installation of cap 160. After proper insertion of cap 160, a vibrational welding horn, for example, is used to weld lip 132 to chamfered edges 163 on cap top surface 162, creating localized fusion. Thereafter, lip 132 extends generally radially inward with respect to bore 130.

With the dual retention mechanism in FIG. 3, bearing cap 160 is more securely restrained. Thus, unwanted rotational movement is prevented. Also, there is less likelihood that cap 160 will push back out of bore 130. Reduced movement of bearing cap 160 provides improved reliability and longer bearing life.

Ball joint 120 also has many of the same features as the previous embodiment. Specifically, integral bearing seat 34 supports a lower portion of ball stud head 52 to prevent vertically downward movement while providing a low friction surface 36 for relative movement.

FIG. 4 shows a series of reinforcing ribs 180, 182 provided in a pattern on the exterior of housing 122. Ribs 180 are circumferentially spaced apart along outer portion 127 of eye 126 and extend generally vertically. Ribs 180 do not extend to the uppermost portion of eye 126. Instead, ribs 180 are spaced vertically away from lip 132 to allow consistent fusion of lip 132 to cap 160. Ribs 182 extend horizontally on housing 122 and are provided at predetermined locations to improve strength and rigidity.

In addition, reinforcing ribs 180, 182 decrease costs by reducing the amount of material and processing cycle time. Ribs 180, 182 can also increase dimensional stability of housing 122. By designing and locating the ribs so as to maintain generally equal wall thicknesses in housing 122, shrinkage can be better controlled.

Embodiments of the present invention that do not utilize a lip for retaining the bearing cap can have ribs that extend all the way to the uppermost portion of the eye. If the ribs are an objectionable appearance for users accustomed to smooth, steel housings, then the reinforcing ribs may be eliminated by providing increased strength in other ways. For example, stronger materials or increased housing wall thicknesses could be used.

Another embodiment of the present invention is illustrated in FIG. 5. Ball joint 220 has a bearing cap 260 with threads 268 that screw into mating threads 232 in through bore 230. Cap 260 also has ratchet teeth 269, shown in FIG. 6, located on an outer peripheral surface 272 of a rim 274 to engage and interlock with ratchet teeth 233 provided in through bore 230, best seen in FIG. 8. After cap 260 has been initially screwed into bore 230, ratchet teeth 269 engage corresponding teeth 233 to provide incremental tightening of cap 260. At this point in assembly, cap 260 can only move in a tightening direction due to a one way ratchet effect of the teeth 233, 269. Thus, cap 260 cannot be removed from through bore 230 without destroying the ratchet teeth. To tighten cap 260 and establish a pre-load on ball joint 220, a tool (not shown) is inserted into one or more mating cavities 270 on cap top surface 262. If an adjustment of ball joint 220 is needed during its service life, a tool (not shown) can again be used to further tighten cap 260 and eliminate joint looseness caused by wear. Therefore, the latest embodiment offers the added benefit of adjustability after initial installation in a vehicle (not shown), to compensate for any looseness that develops during service.

There can be any desired number of ratchet teeth 233, 269 having any suitable shape, angle, or size. Although ratchet teeth 269 are shown on an outer peripheral rim surface 272, they could easily be located on a bottom surface of rim 274. Likewise, ratchet teeth 233 can be located so as to mate with teeth on a bottom surface of rim 274. Moreover, the thread pitch on threads 268, 232 can be modified depending on the degree of incremental torque adjustment required.

FIG. 8 also shows a top view of reinforcing ribs 280, 282. Vertically extending ribs 280 are spaced apart circumferentially around outer portion 227 of eye 226. In this embodiment, ribs 280 extend to the uppermost portion of eye 226. Horizontally extending ribs 282 provide improved strength and rigidity for housing 222 and stem 224.

Axial slots 290 can be provided in the lead threads of both cap 260 and eye 226. FIG. 9 shows an example of slots 290 located on cap 260. Although not shown, corresponding slots would be located on eye 226 allowing cap 260 to be pushed into through bore 230 upon orienting slots 290 in an offset relationship. The slotted design decreases assembly time and requires less rotations to install cap 260.

FIG. 10 illustrates a further embodiment of the present invention combining a threaded cap connection with a welded lip retention. Cap 360 screws into through bore 330 as described in the previous screw thread designs. Instead of ratchet teeth retention, however, cap 360 is held in place by a lip 333 that is locally fused to cap 360 using any suitable technique, including vibrational welding or ultrasonic welding. Unlike ratchet teeth retention, the embodiment illustrated in FIG. 10 is not designed to be adjusted during routine maintenance. Future wear can be compensated only by pre-loading cap 360 in joint 320.

Preferred embodiments of the present invention have been disclosed. A person of ordinary skill in the art would realize, however, that certain modifications would come within the teachings of this invention. Therefore, the following claims should be studied to determine the true scope and content of the invention.

What is claimed is:

1. A ball and socket joint comprising:
   a one-piece polymeric housing having an eye connected to a stem;
   said eye including a through bore having a retaining feature and an integral bearing surface;
   said stem projecting radially outwardly from said eye and having an attachment portion for connecting to a support;
   a plurality of generally vertical reinforcing ribs spaced apart circumferentially around an exterior surface of said eye for increased dimensional stability;
   at least one generally horizontal reinforcing rib extending from said eye to said stem for providing increased housing stiffness;
   a ball stud having a head connected to a shank, said head being received in said eye of said housing and contacting said integral bearing surface, wherein said bearing surface has an inner diameter less than a diameter of said head;
   a polymeric bearing cap having a generally annular shape including a top surface, a bottom surface and a side surface, said bearing cap being inserted into said eye and having a complementary retaining feature for cooperating with said retaining feature of said eye to hold said cap in position adjacent said ball stud.

2. The ball joint of claim 1, wherein said retaining feature comprises a diameter of said through bore being slightly smaller than a diameter of said bearing cap, such that a press fit condition exists.

3. The ball joint of claim 2, further comprising a lip extending radially inward and fused to said bearing cap to prevent said cap from pushing out of said through bore.

4. The ball joint of claim 1, wherein said retaining feature comprises screw threads in said through bore which matingly thread into screw threads on said bearing cap.

5. The ball joint of claim 4, further comprising ratchet teeth on a rim of said bearing cap for engaging corresponding ratchet teeth on said housing to prevent loosening and provide incremental torque adjustment.

6. The ball joint of claim 4, further comprising a lip extending radially inward and fused to said bearing cap to prevent said cap from loosening in said through bore.

7. A ball and socket joint comprising:
   a one-piece polymeric housing having an eye;
   said eye including a through bore having a threaded portion and an integral bearing surface;
   said housing further including ratchet teeth adjacent said through bore;
   a ball stud having a head connected to a shank, said head being received in said eye of said housing and contacting said integral bearing surface, wherein said bearing surface has an inner diameter less than a diameter of said head;
   a polymeric bearing cap having a generally cylindrical shape including a top surface, a bottom surface and a side surface, said bearing cap being inserted into said eye and having a threaded portion on said side surface for cooperating with said threaded portion of said eye to hold said cap in pre-loaded contact with said ball stud; and
   said bearing cap further including a rim having ratchet teeth that engage said housing ratchet teeth to prevent loosening and provide incremental torque adjustment.

8. The ball joint of claim 7, wherein reinforcing ribs are located in a pattern on an exterior surface of said housing, adjacent said eye, said ribs being spaced apart at predetermined locations for providing increased stiffness.

9. The ball joint of claim 7, wherein said bearing cap ratchet teeth are located on an outer periphery of said rim.

10. A ball and socket joint comprising:
    a one-piece polymeric housing having an eye;
    said eye including a through bore having a retaining feature and an integral bearing surface;
    reinforcing ribs being located in a pattern on an exterior surface of said housing, adjacent said eye, said ribs being spaced apart at predetermined locations for providing increased stiffness;
    a ball stud having a head connected to a shank, said head being received in said eye of said housing and contacting said integral bearing surface, wherein said bearing surface has an inner diameter less than a diameter of said head;
    a polymeric bearing cap having a generally annular shape including a top surface, a bottom surface and a side surface, said bearing cap being inserted into said eye and having a complementary retaining feature for cooperating with said retaining feature of said eye to hold said cap in position adjacent said ball stud; and
    ratchet teeth on a rim of said bearing cap for engaging corresponding ratchet teeth on said housing to prevent loosening and provide incremental torque adjustment.

\* \* \* \* \*